US005257317A

United States Patent [19]

Stavrou

[11] Patent Number: 5,257,317

[45] Date of Patent: Oct. 26, 1993

[54] SOUND RECORDING CONSOLE

[76] Inventor: Michael P. Stavrou, 95 Muston Street, Mosman, NSW 2088, Australia

[21] Appl. No.: 659,377

[22] PCT Filed: Aug. 31, 1989

[86] PCT No.: PCT/GB89/01015

§ 371 Date: Apr. 29, 1991

§ 102(e) Date: Apr. 29, 1991

[87] PCT Pub. No.: WO90/03073

PCT Pub. Date: Mar. 22, 1990

[30] Foreign Application Priority Data

Sep. 1, 1988 [GB] United Kingdom ................ 8820625

[51] Int. Cl.[5] ............................................ H04B 1/00

[52] U.S. Cl. ...................................... 381/119; 381/98; 200/5 A; 200/86 R; 178/17 B; 84/711; 338/99

[58] Field of Search ................ 381/119, 98; 200/5 A, 200/86 R; 178/17 C, 17 D, 18; 84/711; 338/99, 96, 114

[56] References Cited

U.S. PATENT DOCUMENTS 3,854,018 12/1974 Reynolds et al. .................. 200/5 A
4,631,525 12/1986 Serravalle, Jr. ..................... 381/109
4,746,894 5/1988 Zeldman ............................. 338/114
4,894,493 1/1990 Smith et al. ........................ 200/5 A
5,060,272 10/1991 Suzuki ................................ 381/119

FOREIGN PATENT DOCUMENTS 2850687 5/1980 Fed. Rep. of Germany .

OTHER PUBLICATIONS

Journal of the Audio Engineering Society, vol. 28, No. 3, Mar. 1980 (New York, USO J. C. Brown et al., pp. 120–135.

Journal of the Audio Engineering Society, vol. 30, No. 3, Mar. 1982, Audio Engineering Society, Inc. (New York, U.S.), J. W. Richards et al. pp. 117–126.

*Primary Examiner*—John K. Peng
*Assistant Examiner*—Nina Tong
*Attorney, Agent, or Firm*—Cushman, Darby & Cushman

[57] ABSTRACT

A control console (1) for use in sound recording, and/or effects such as dubbing, the console (1) having a plurality, say 100 of sound channels, the console comprising a touch sensitive channel selector (2) having as many touch sensitive elements (3) as there are selectable channels of the console (1), whereby to select a channel by touch on the selector (2).

9 Claims, 2 Drawing Sheets

SOUND RECORDING CONSOLE

FIELD OF THE INVENTION

The invention relates to a sound recording console.

BACKGROUND OF THE INVENTION

Sound recording consoles are generally physically large so much so that they are longer than the arm span of an operator who often has physically to move to left or right along the console in order to operate channels, faders and modules which are at or adjacent one end or the other of the console. Such movement by an operator is time-consuming and therefore expensive, and tiring and therefore prone to lead to errors in operation, which can result in poor "take" with consequent need for repetition, which again is expensive. With long consoles, the operator is rarely positioned in the acoustic centre of the sound image. This results in coarse manipulations of the sound. Space is also a major consideration in this age of high rent and shrinking real estate. Large rooms for long consoles mean expensive rents. Future studios may not have the room for a 60-channel console. Long digital consoles are extremely expensive.

SUMMARY OF THE INVENTION

It is accordingly an object of the invention to seek to mitigate these disadvantages.

According to the invention there is provided a control console for use in electronic control operations such as sound recording and/or effects, comprising a plurality of channels, and a touch sensitive channel selector means operative to select a desired channel of the console and having as many touch sensitive areas as there are selectable channels of the console, wherein the channel selector means comprises an elongate member positioned substantially centrally of the console.

Using the invention it is possible to access selected remote channels from a central position of the console. This arrangement provides for an ergonomic arrangement so that an operator may sit in front of the console substantially centrally thereof and operate all channels from one lateral extremity of the console to the other.

The elongate member may comprise a rod, bar or strip of translucent material bearing the touch sensitive elements. This provides for a relatively simple construction.

The rod, bar or strip may be of glass.

The touch sensitive elements may comprise a metal strip running the length of the rod, or studs spaced apart along the length of the rod.

Sensors may determine exactly within which channel area or segment a touch is occurring at all times.

The rod, bar or strip may be mounted flush in a fascia of the console.

The console may include, associated with the channel selector means, an indicator means for indicating whether or not a particular channel is in use.

Control consoles for use in sound recording and effects embodying the invention are hereinafter described, by way of example, with reference to the accompanying drawings.

DETAIL OF DESCRIPTION

Figure 1:
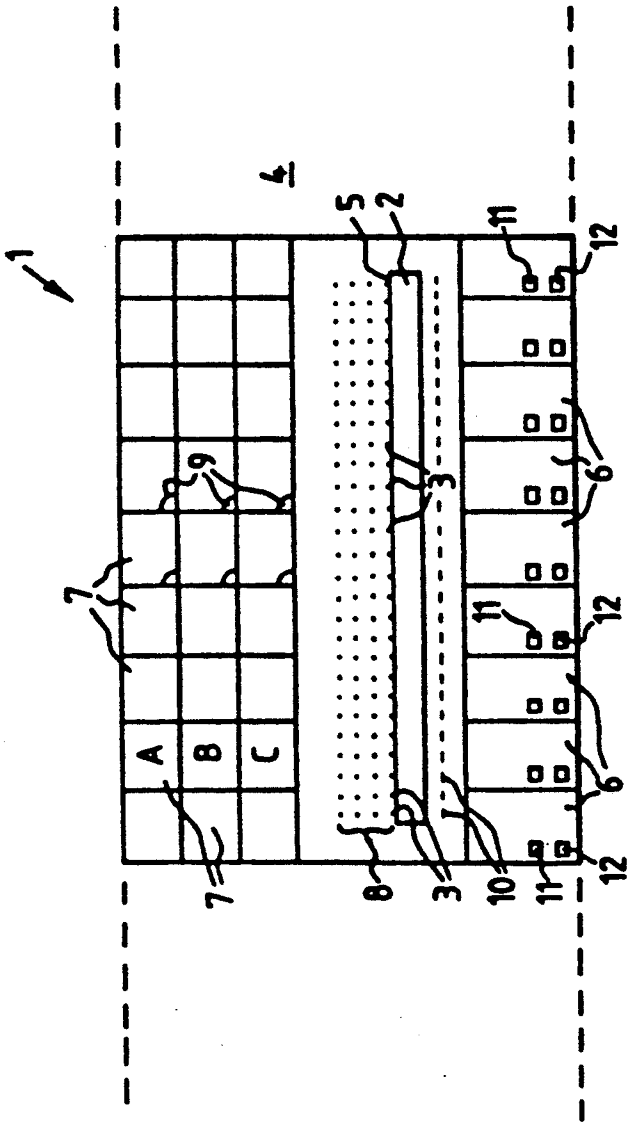
FIG. 1 shows schematically an elevational view of a fascia of the console according to the invention.
Figure 2:
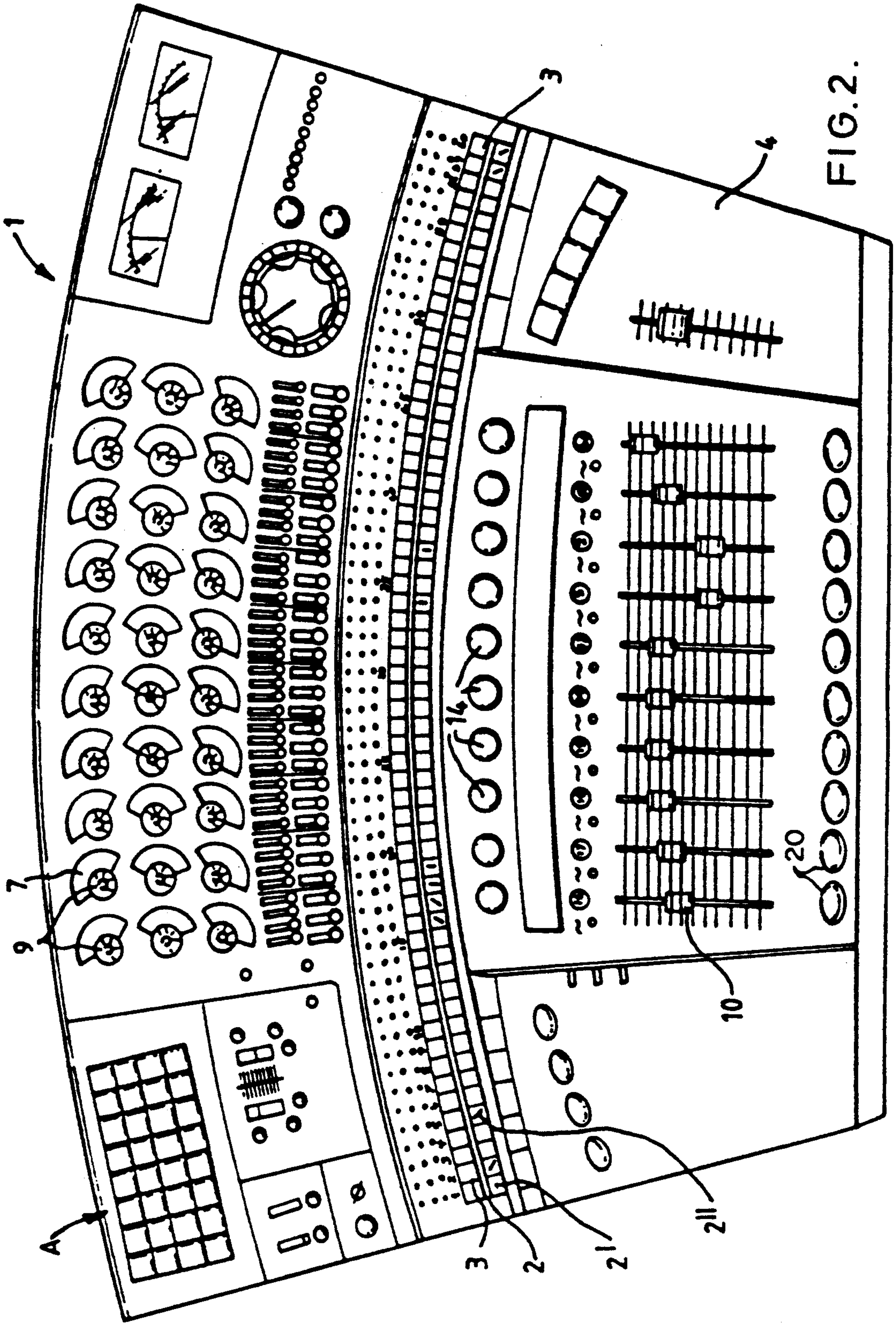
FIG. 2 shows a plan view of a further console according to the invention.

Referring to the drawings, in which like parts are indicated by like numerals, there is shown in FIGS. 1 and 2 a control console 1 for use in sound recording, and/or effects such as dubbing, the console 1 having a plurality, say 100 (60 on FIG. 2), of sound channels, the console comprising a touch sensitive channel selector means 2 having as many touch sensitive elements 3 as there are selectable channels of the console 1, whereby to select a channel by touch on the selector means 2.

The channel selector means 2 is situated centrally of the console fascia 4 and is a translucent member, in the embodiments shown being in the form of a rod of transparent glass which has along one edge 5 in FIG. 1 a plurality of spaced apart metal studs forming the touch sensitive elements 3, there being as many studs 3 as there are channels, in this case there therefore being 100 studs as there are 100 channels. In FIG. 2 the elements comprise segments or sections 3. The sections 3 in FIG. 2 comprise an invisibly segmented touch sensitive metal strip which is sensitive only in the middle of each segment, so that an operator's fingers do not inadvertently activate an adjacent channel. The rod 2 has identification means such as numbers which indicate which stud or segment 3 controls which channel. The studs or segments 3 are connected electrically to the electronics/software comprising each channel, which electronics/software does not of itself form part of the invention so will not be described further here.

The glass rod 2 is a semi-cylindrical rod set in a duct in the fascia 4 so that it is flush with the surface of the fascia 4.

The console 1 includes a plurality (nine in FIG. 1, though there are preferably ten, as in FIG. 2) of physical faders 6 and a plurality of modules 7 associated therewith so that these are less in number than the number of channels. There is also an indicator means in the form of an LED display 8 above (as viewed) each channel stud 3.

In FIG. 2, the rod 2 incorporates indicating means in the form of a five segment LCD display 2′ beneath each segment 3 to indicate where, in relation to the ten physical faders, each selected channel appears. In other words, if channel 5 has been selected to physical fader (and channel) 10 (the furthest physical channel to the right as viewed) then a short line or indicator 2″ pointing to the extreme right will appear directly underneath the associated rod segment (5). This indicator 2″ serves two functions. It shows which inputs have been selected for channel manipulation and it shows, at a glance, where to direct the eye to quickly grab one.

In FIG. 1 the dash-lines indicate the desk length of the console 1.

It will be appreciated that the rod 2 in the embodiment of FIG. 1 is effectively divided into segments by the studs 3, there being as many segments as there are channels to be selected. In use of either embodiment, when an operator wishes to select any channel, he merely runs his hand along the rod 2 and touches the appropriate stud or segment 3 for the associated channel. This means that if he wants to select a channel to the far left, say channel 1, he touches the left hand end of the rod 2 without having physically to move to the left of the console 1. The rod 2 physically controls the channels remotely. When the operator wants to access another channels, he touches the corresponding area of the rod 2 so that the channel can be repeatedly change. In addition to indicating the channel numbers associated with each channel, a particular musical instrument for example may also be indicated on the rod 2.

An LED of the display 8 also indicated that a signal is present in a particular channel. Each LED display has a plurality of separate LEDs for each segment so that another LED displays the fact that fader movement is in progress. A third LED displays other information, for example warning of channel overload.

This provides an equalisation display in that a line grows outwards, upwards, and/or downwards, indicating midrange, high frequence, or low frequence alterations respectively. This growing line would be a choice of two colours. One colour line (e.g. red) would indicate a boost, while another colour (e.g. blue) would indicate attenuation is in progress.

As shown, the modules 7 associated with each physical fader are above them, as viewed, and are interrogated in a similar manner. The modules are split into three sections, A, B, C, and have an area 9, a quick scan area, which is sensitive to touch so, by touching the rod 2 quick scan area 9 while sliding another finger along the rod 2 it is possible to scan the desk by touching the routing module to monitor what other channels are doing in the routing department. The area 9 is touched before the rod 2. By touching the rod 2 in the appropriate segment, the software is instructed to dump all channel related controls and display to the individual physical channel that is selected and to begin the dumping process with the particular module touched. The areas 9 are in fact sensitive in two halves, effectively a northern and southern hemisphere or semi-circle. By touching only the "southern" half only a left equaliser (B) or one send (C) channel is placed into an interrogation mode. This is thus a priority instruction 9 which speeds up the retrieval system to the point where all the channels can be interrogated quickly, in fact as quickly as the eye could normally scan along a long console. Stated in another way, the console 1 embodying the invention allows the eye of the operator to be concentrated on the central fascia 4 whilst moving the finger along the master central channel selector rod 2. Alternatively, touching the complete surface of an interrogation point 9 would priority dump display and control into all physical channels and as a finger was run along the rod 2, the displays of all modules would change giving a visual effect equivalent to moving physically over the length of a long console. The console 1 has a scribble strip 10 below the rod and above the faders 6, for writing identification, viz. if 1–10 is written on the strip 10 after selection, and channels 10–20 are then selected, the writing 1–10 disappears and re-appears in miniature under the glass rod 2, the semi-cylindrical shape of which magnifies the miniature writing. Alternatively one may write directly onto the mini-script 2'. This writing remains there until wiped off. As channels are selected for control, the operator's own handwriting/scrawl/language/symbols/etc., appear, enlarged, onto the scribble script (10) over the appropriate faders.

. In the embodiment 9 FIG. 2, there is a single module "A" is a singular area of controls located to the left above the rod 2 as viewed. It contains, for example, a routine module (32 tracks), high and low pass filters, compression and expansion devices, and a phase reversal switch. This module, A, can be a collection of any controls that are of relatively low priority in terms of needing to be displayed in a plurality or of those controls that are fiddled with the least, in use.

Finally, the faders 6 each have two buttons 11 and 12, one 12 for HOLD and one 11 for INJECT or REPLACE (FIG. 1). If the button 12 is held whilst selecting a channel whilst touching the rod 2, all faders change except the one being held. If the button 11 is held whilst selecting a channel on the rod, then all faders 6 remain as they were except for the one which is replaced by the channel. In FIG. 2, the HOLD button is an oval node 20 positioned below the fader for easy access by the palm. This reduces reaction times to secure present selections while "diving" across the console to grab others. In referring to the REPLACE button as the INJECT button, it injects any selected signal into any fader.

In both embodiments, functions (the instant listening of only one channel for checking purposes) are accomplished by one or two ways. Each fader has a solo button 14 FIG. 2. The area beneath each rod segment (same area used to display selected channel locations) is a touch/pressure sensitive solo button. Pressing will solo this channel regardless of its allocation status. The entire lower segment will alight. This same surface is a multi-function button that can serve to program mutes, for example.

A console embodying the invention is also suitable to control large channels of MIDI information stated on another way, the console can be used for MIDI mixing/processing applications. (It will be understood that MIDI is a computer language used to control electronic instruments).

I claim:

1. A control console for use in electronic control operations including sound recording or recording effects from a plurality of channels, said console comprising a plurality of channel indicators equal to said plurality of channels and corresponding to each thereof, said plurality of channel indicators being distributed across said control console, and a plurality of control devices being substantially less in number than the plurality of channels, and said control console further comprising a touch sensitive channel selector means interconnected with said plurality of channels and said channel indicators for selecting a desired number of channels from among said plurality of channels, up to the number of said plurality of control devices, and to allocate a corresponding one of said plurality of control devices to each said selected channel and to activate the indicator corresponding to each said selected channel, whereby the selected channel to the control device allocation substantially reduces the overall dimensions of the control console relative to a control console having one control device for each channel.

2. A control console as claimed in claim 1, wherein said channel selector means is repeatedly operable to change the channel to control device allocation.

3. A control console as claimed in claim 2, wherein said channel selector means further includes indicia indicating the content of the corresponding selected channel.

4. A control console as claimed in claim 2, wherein said channel selector means comprises a continuous elongate member.

5. A control console as claimed in claim 4, wherein said elongate member is selected from a group consisting of a rod, bar or strip.

6. A control console as in claim 5 wherein said elongate member is translucent.

7. A control console as in claim 5 wherein said elongate member is comprised of glass.

8. A control console as claimed in claim 1, wherein a further indicator is provided for each said channel, said further indicator indicating the control action carried out by the allocated control device.

9. A control console as in claim 1 wherein said plurality of control devices are arranged adjacent one another.

* * * * *